(12) United States Patent
Fidler (10) Patent No.: US 6,725,051 B2
(45) Date of Patent: Apr. 20, 2004

(54) METHOD FOR OBTAINING LOCATION DATA

(75) Inventor: Mark Fidler, Granite Bay, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 533 days.

(21) Appl. No.: 09/846,022

(22) Filed: Apr. 30, 2001

(65) Prior Publication Data

US 2002/0161547 A1 Oct. 31, 2002

(51) Int. Cl.[7] .................................................. H04Q 7/20
(52) U.S. Cl. .......................... 455/456.1; 455/456.2; 455/456.3; 455/456.4; 455/456.5; 455/456.6
(58) Field of Search ...................... 455/456.1, 456.2, 455/456.5, 456.6, 456.3, 456.4

(56) References Cited

U.S. PATENT DOCUMENTS 6,505,049 B1 * 1/2003 Dorenbosch ............. 455/456.2
6,677,895 B1 * 1/2004 Holt ......................... 455/456.5
2001/0018349 A1 * 8/2001 Kinnunen et al. .......... 455/456
2002/0155843 A1 * 10/2002 Bahl et al. .................. 455/456

* cited by examiner

Primary Examiner—Sinh Tran
Assistant Examiner—Huy D Nguyen (57) ABSTRACT

A method for obtaining location data for use by a peripheral device such as a printer or copier that may be moved from time to time has steps of querying portable second devices such as PDA's, personal computers, and the like that may be near to the peripheral and that may have RTLS capabilities for location data. Preferably, a step of detecting a trigger event such as a time-out or an interrupt causes the peripheral to either initiate a search for a second device or to initiate a location data query with a second device already in communication with the peripheral. The location data obtained from the second device is preferably assigned a distance factor value corresponding to how close the second device is to the peripheral. The peripheral location data will regularly be updated with more reliable location data as it is obtained. Further, the location data may be broadcast to a network connected to the peripheral device so that all users of the network can easily locate the peripheral device.

25 Claims, 5 Drawing Sheets

METHOD FOR OBTAINING LOCATION DATA

FIELD OF THE INVENTION

The present invention is related to the field of obtaining location data. More particularly, the present invention is related to methods for peripheral devices to obtain location data from second devices.

BACKGROUND OF THE INVENTION

Electronic devices continue to expand their presence in our everyday routines. Portable personal computers, cellular phones, and devices such as hand held personal digital assistants ("PDA") are a few examples of devices that have become relatively ubiquitous. Additionally, advancing wireless communications protocols for communications over short, medium, and long ranges allow these portable electronic devices to readily connect with one another as well as to a wide variety of other resources.

Examples of short-range wireless protocols include infrared light transmissions ("IR") and short-range radio frequency ("RF") transmissions. When used with portable devices, the operable range of IR communications is usually limited by the ability of the handheld device to accurately aim an IR at another device's IR port. Current IR protocols for portable devices support transmission over a range of about 3 meters. Short range RF is also currently used for portable device wireless communication. An example is the "Bluetooth" RF protocol that allows computer and other electronic devices to communicate over short distances without cabling. Bluetooth is a wireless standard developed by an industry consortium made up of 3Com, Ericsson, IBM, Intel, Agere, Microsoft, Motorola, Nokia, and Toshiba with a mission of creating a standard wireless protocol. More information, including protocol specifications, can be obtained on the Bluetooth website: www.bluetooth.com, with the contents thereof incorporated herein by reference.

The current Bluetooth protocol has an operable range of about 10 meters. IR and RF technologies are also available for wireless communication over medium and long ranges, with operable range generally determined by the power of RF signal. Medium range RF technologies include those used for wireless local area network ("WLAN") communications. Longer-range wireless technologies generally include more powerful RF transmissions such as those used for cellular phones.

Wireless technologies are also available for reporting location data of portable devices. Generally, these technologies may be referred to as real time location systems ("RTLS"), with a well-known example comprising global positioning systems ("GPS"). RTLS technology generally comprises triangulating with satellites to determine position. The adoption of RTLS technology for applications and devices has been rapid. While the technology has traditionally been adopted by industry and the military, it has become widely used in consumer products. For example, outdoorsmen, sailors, transportation professionals, and travelers use handheld GPS units for instant location data. Automobiles are currently available with RTLS systems that allow computers in the car to indicate to the driver a current location for the car. Further, the car-based computer may be able to query a map database to determine detailed directions from the car's current location to reach a desired location, and to then give those detailed directions to the driver. The map database may be stored locally on the car computer, or the computer may query a network such as the Internet or other service remotely via wireless technology.

More and more widely available portable electronic devices will utilize RTLS type technology in the near future. As an example, handheld computers and PDA's are becoming available that feature RTLS technology. These devices will be able to take advantage of their known location to report various desired data about nearby resources. As an example, a mobile user may use a PDA to determine what restaurants are nearby. The PDA will use RTLS technology to determine its location, then query via a wireless connection a network service provider to determine what restaurants are close by. Further, the PDA may even query these restaurants over the network service to place an order.

By way of additional example, PDA's, portable personal computers, and the like may access via wireless communications resources such as printers. For example, a mobile user may wish to print an e-mail from his PDA, a photo from his digital camera, a map for directions to a selected location, or the like. The mobile user looking for local restaurants, for instance, may wish to download menus from restaurants to his PDA, and then print paper copies. To do so, the RTLS component determines the PDA location, then may query a network service via wireless technology to determine if a printer is close by. Once a printer is located, the user can go to the printer and send data from his PDA to the printer via a short-range wireless signal for printing. Many other examples are of course anticipated that will utilize similar methods. By way of example, it will be of utility for a network administrator to know the geographical location of network components such as printers for maintenance and support, general inventory, and other purposes.

To accommodate such methods, the printer or other device that is to be a resource for the portable PDA or computer will of course need to be able to determine and report its location. In order to do so, two general options exist for the device. As a first, location data may be manually input to the device for reporting. This first method is disadvantageously susceptible to error, particularly for devices such as printers that may be moved from time to time. Errors may occur in the data entry, or the device may be moved to a new location. As a second method, the device may of course be provided with long-range wireless RTLS technology component for determining its location. While this second method is likely to have a high accuracy, it is disadvantageous in that RTLS componentry tends to be costly.

Unresolved needs therefore exist in the art.

SUMMARY OF THE INVENTION

The present invention is directed to a method for determining a location for a peripheral device. The method comprises the general steps of communicating with a second device via a wireless protocol and querying the second device for its location data. After it is obtained, the second device location data is evaluated to determine its reliability, and is compared to the device's current location data to determine if it is more reliable. A preferred method for determining the data reliability comprises determining the protocol of data transmission: short-range protocols are assigned a higher reliability than medium range protocols. The second device location data will then replace the device's current location data if it is more reliable. In a preferred embodiment of the method of the invention, the method is for practice with a document production peripheral device including, but not limited to, faxes, scanners, printers, and copiers.

The preferred method embodiment also comprises a preliminary step of detecting a trigger event of either an internal or external type before communicating with the second devices such as PDA's or portable computers. Internal type trigger events comprise the occurrence of peripheral device power up, change of network settings, a defined time passage, or the like. External trigger events comprise reception of an interrupt signal, indicating that a second device is in communication with the peripheral device. Internal trigger events will initiate a search for a second device, while external trigger events will initiate a dialogue with a device already in communication with the peripheral device. If a search is to be initiated, preferred method steps comprise a sequential search progression logic that allows the distance between the peripheral device and the second device to be estimated.

It will be appreciated that the present invention lends itself well to practice in the form of a computer program product. Accordingly, it will be understood that an additional embodiment of the present invention comprises a computer program product for executing computer instructions stored in a computer readable medium that when executed cause a peripheral device to execute the various steps of embodiments of the method of the invention.

The various methods and computer program products of the invention thereby solve many otherwise unresolved problems in the art in a novel and elegant manner. For example, the invention allows a peripheral device to determine location data without the expense of requiring a RTLS type component, and without the susceptibility to errors associated with depending on manually entered location data. The present invention thereby provides cost and efficiency advantages by leveraging the technology present in second devices.

The above brief description broadly sets forth the more important features of the present disclosure so that the detailed description that follows may be better understood, and so that the present contributions to the art may be better appreciated. There are, of course, additional features of the disclosure that will be described hereinafter that further describe the subject matter of the invention. In this respect, before explaining embodiments of the disclosure in detail, it is to be understood that the disclosure is not limited in its application to the details set forth in the following description or illustrated in the drawings. The present invention is capable of other embodiments and of being practiced in various ways, as will be appreciated by those skilled in the art. Also, it is to be understood that the phraseology and terminology employed herein are for description and not limitation.

DETAILED DESCRIPTION

Turning now to the drawings, the present invention directed to a method and computer program product for detecting a location for practice by a peripheral device will be described in greater detail. In order to do so, an invention embodiment will be first broadly described with reference to the flow chart of FIG. 1, with a more detailed discussion of the embodiment to follow with reference to the remaining FIGS. 2–5.

Figure 1:
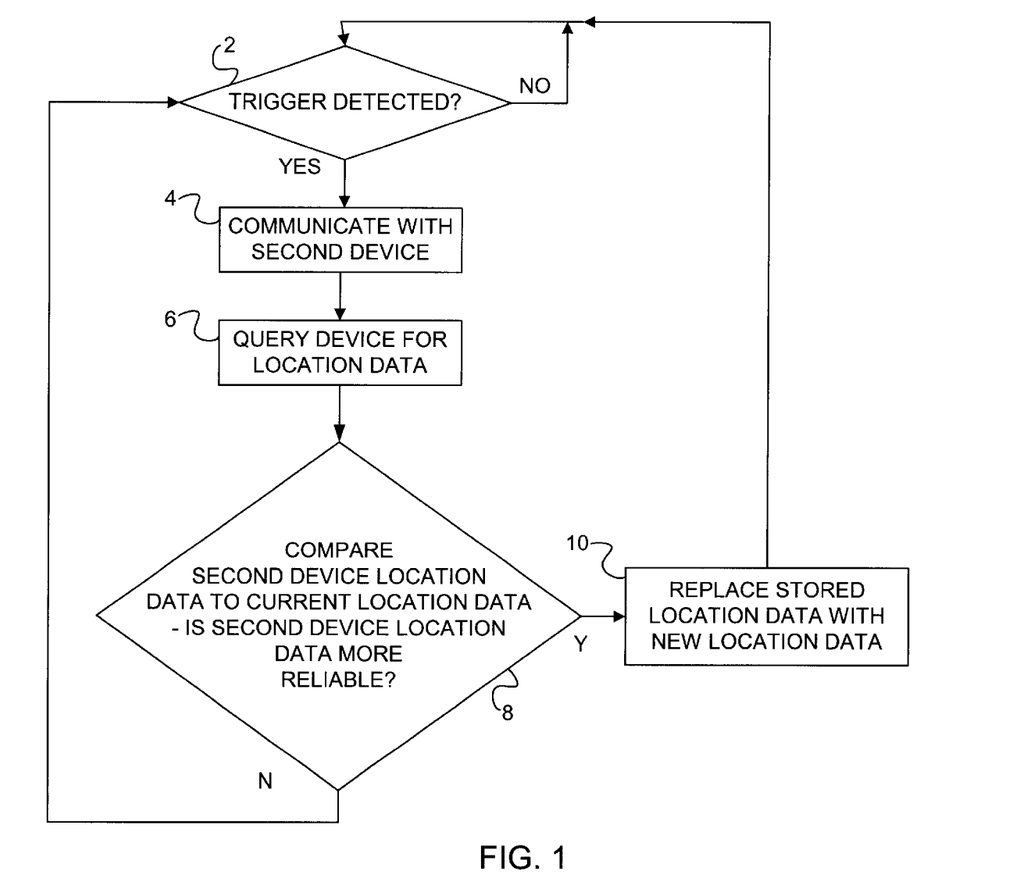
FIG. 1 is a flow chart illustrating an embodiment of the method and computer program of the invention.

With reference therefore now drawn to the flow chart of FIG. 1, the invention embodiment comprises a first step of detecting a trigger event (block 2). Detection of a trigger event indicates that a second device should be communicated with (block 4) in order to obtain location data from that device (block 6). The trigger may be of an "internal type", indicating that a search for a second device should be initiated, or may be of an "external type", indicating that a second device is in communication with the peripheral device and that it may be queried for location data. Once obtained, the second device location data is evaluated to determine if it is more reliable than the location data the peripheral device is currently using (block 8). As used herein the term "reliable" is intended to refer to a likelihood of accuracy. Thus determining whether a first set of location data is more "reliable" than a second set generally comprises determining which data set has a higher likelihood of accuracy. If the second device location data is more reliable than current data, the current location data is replaced with the second device location data (block 10). If not, the current location data is retained.

As used herein, the term "trigger event" is indicated to refer to the occurrence of an event that has been defined to indicate that second device location data should be obtained. The present invention embodiment comprises two preferred general types of trigger events. A first trigger type, referred to herein as an "external trigger", relates to an opportunity to query a second device that has initiated communications with the peripheral device to input data to the peripheral device. The data may comprise location data, or may comprise job data for execution by the peripheral device that is unrelated to location data. By way of example, an external trigger may comprise a determination that a PDA is sending a print job to a printer peripheral device, or a PDA device may be communicating with the peripheral with the specific purpose of inputting location data.

The second preferred general trigger type, referred to herein as an "internal trigger", comprises an internally generated trigger indicating that new location data should be searched for. This type of trigger event is intended to indicate that there is an appreciable chance that the peripheral device location has changed. Preferred examples of this second type of trigger type comprise peripheral device power-up, change of network connectivity settings, and passage of a selected time interval. If the peripheral device is powering up, for example, there is a chance that the device has been moved while power was off. Also, if the peripheral network connectivity settings have changed, such as a change of IP address, there is an appreciable chance that the peripheral physical location has changed. Likewise, if passage of a pre-defined time limit has occurred, there is a chance that location conditions have changed. Pre-defined time limits may comprise any time period practical for a particular invention embodiment. By way of example and not limitation, time periods of the order of seconds, minutes, hours, days, weeks, or months may be comprised.

Figure 2:
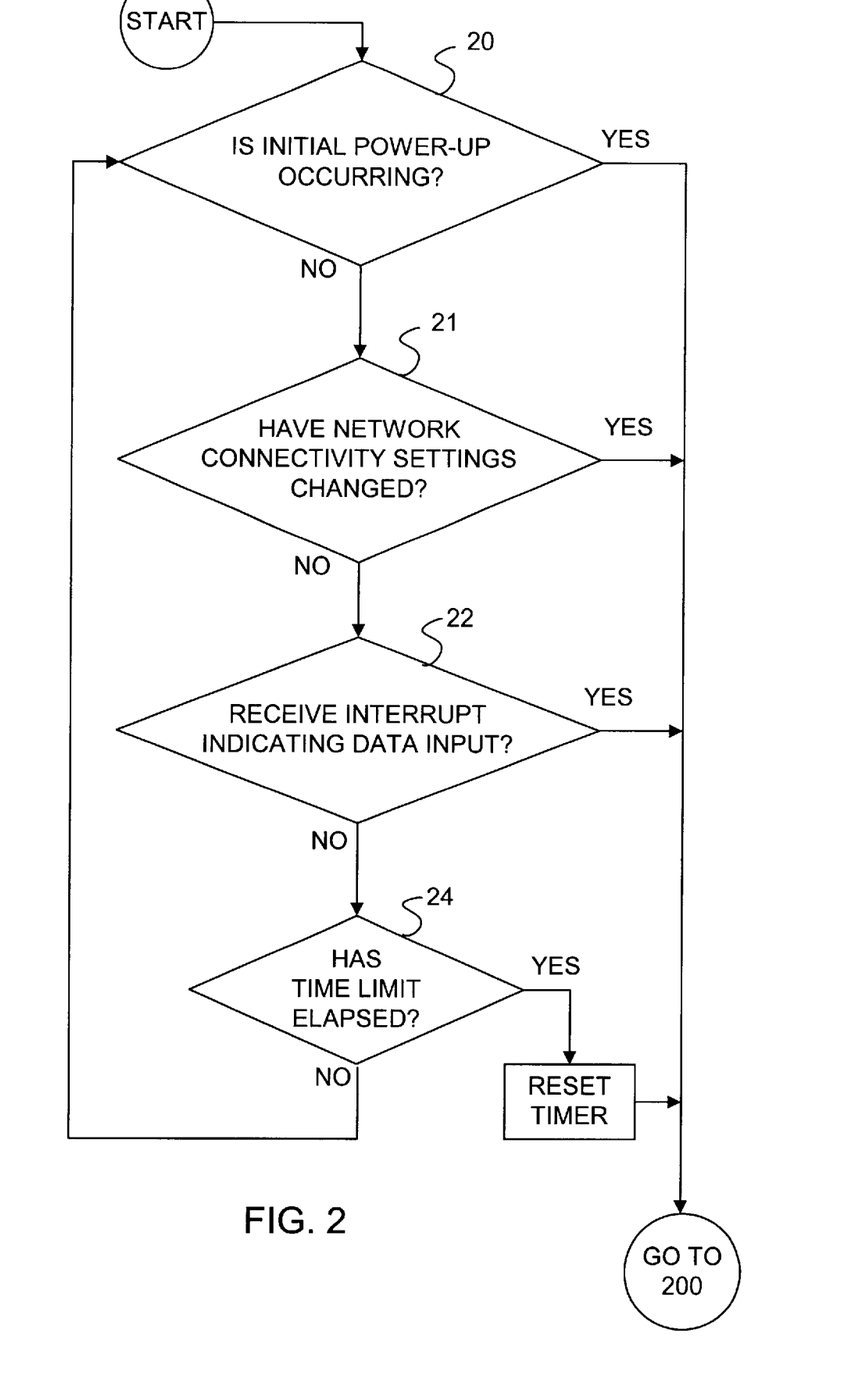
FIG. 2 is a flow chart illustrating a portion of an embodiment of the method and computer program of the invention comprising steps for detecting a trigger event.

FIG. 2 illustrates a subset of steps for detecting preferred trigger events. In particular, embodiment method steps comprise detecting whether initial power up of the peripheral device has occurred (block 20), network connectivity settings have changed (block 21), reception of an interrupt has occurred (block 22), or passage of a desired time limit has occurred (block 24). The step of detecting the interrupt signal trigger (block 22) is a preferred example of an external trigger. That is, as used herein, "an interrupt signal indicating data input" is intended to broadly refer to the reception of an interrupt from hardware or software external to the peripheral device indicating that data is to be communicated to the peripheral.

By way of example, if the peripheral device comprises a printer, an interrupt signal indicating data input may be received from a PDA sending a print job to the printer. By way of additional example, it may be desired to download accurate location data to the printer. To do so, a portable RTLS enabled second device that is closely adjacent to the peripheral device may be used, with a location data transfer command switch toggled on the second device. The toggling of the switch will result in sending a data input interrupt signal to the printer, followed by location data transfer.

It will be appreciated that a trigger event within the scope of the invention may be any of a multiplicity of events. Although two general trigger types and three particular preferred trigger events have been discussed and illustrated in the schematic of FIG. 2, any number may be comprised within the invention as claimed. It will further be appreciated that as used herein, the term "RTLS" is intended to refer to a real time location system that is capable of reporting location data. A preferred example of RTLS comprises satellite based triangulation systems such as GPS. RTLS as used herein, however, is not limited to such systems. Indeed, it will be appreciated that location data may be obtained from a number of sources and technologies that do not depend on triangulation and/or satellites.

Figure 3:
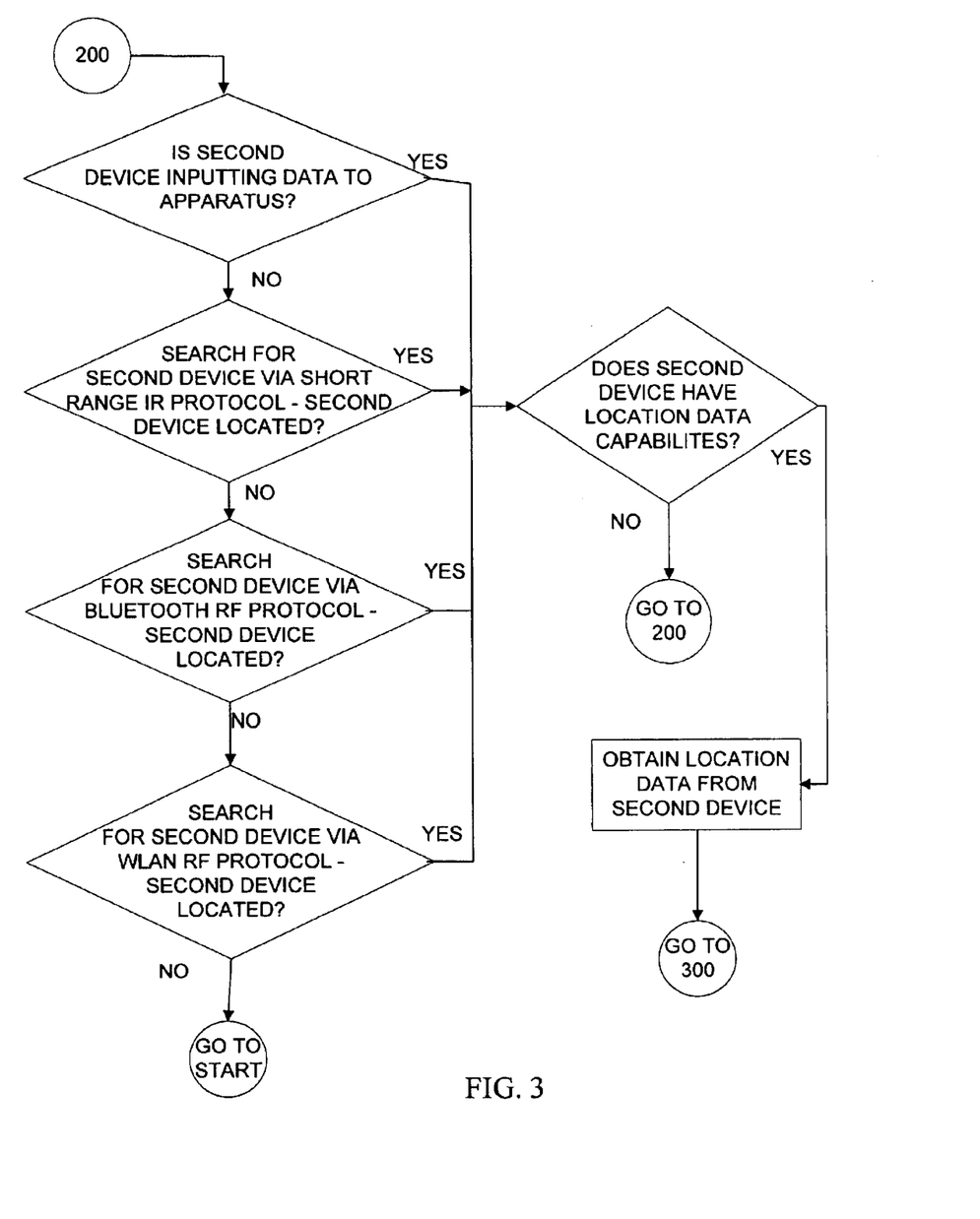
FIG. 3 is a flow chart illustrating a portion of an embodiment of the method and computer program of the invention comprising steps for searching for a second device.

After detection of a trigger event occurrence, this embodiment of the invention proceeds to a subset of method steps for communicating with a second device, as illustrated in the flow chart of FIG. 3. If it is determined that a second device has initiated communication with the peripheral device (i.e., detection of an external trigger) (block 30), the method proceeds to query the second device to determine whether it has location data capabilities (block 38).

An additional embodiment of the invention comprises a two-stage external trigger subset of steps. A first trigger stage comprises a step of detecting an interrupt signal from a PDA indicating input of job data. A subsequent second stage trigger event comprises a step of detecting physical contact with the peripheral. Upon this second stage trigger event the peripheral device will query the PDA for location data. By way of illustration, a first stage trigger would occur when a user sent a print job to a printer peripheral from the user's PDA for printing. When the user physically contacted the printer to pick up the output print job, the second stage trigger would be detected and location data obtained. Detecting physical contact with the peripheral may be accomplished through monitoring of various existing sensors and mechanisms. By way of example, a printer peripheral often has detectors for detecting the presence of an output print job in an output bin or tray. An indication that the job input by the portable PDA was being removed from an output tray could comprise an indication that the user was in physical contact with the printer. By obtaining location data when the user was in physical contact with the peripheral, the location data advantageously has a very high reliability.

Referring once again to FIG. 3, if no second device is in communication with the peripheral device, the method proceeds to search for a second device (blocks 32–36). Preferably, searching for a second device will be accomplished through a sequential procession of method steps that will search for second devices in decreasing order of likely geographical distance from the peripheral device. That is, preferably the invention embodiment comprises steps of searching first for second devices very near to the peripheral device, then for second devices that are farther away but still relatively close, and finally for second devices that may be more distant.

Those knowledgeable in the art will appreciate that there are many ways to accomplish such a geographically sequential search. As a first example, a search could be performed using a wireless protocol that provided information regarding the distance communications were occurring over, such as signal strength. As a second example, method steps may take advantage of different wireless communications protocols having different ranges of operation. By way of example, a search could be conducted that progressively used a short-range wireless protocol, a more medium range wireless protocol, and finally a longer-range protocol.

It is noted that as used herein, the relative terms "short range", "medium range", and "longer range" are relative, and are not to be confused with terms that may be used elsewhere. In particular, as used herein, the term "short range" is intended to refer to a range of not more than about 5 meters, and preferably not more than about 3 meters; "medium range" to refer to a range of not more than about 15 meters, and preferably not more than about 10 meters; and "longer range" to a range of not more than about 100 meters, and preferably not more than about 50 meters. It will be understood that although specific examples of wireless protocols fitting these definitions will be presented herein, they are presented for example purposes only and are not to limit the scope of the invention as claimed. Indeed, it will be appreciated that a wide variety of wireless protocols are presently available with many more currently under development.

This second example of sequential searching has been illustrated in the flow chart of FIG. 3. As an initial step, a short-range search for a second device may be conducted using an infrared light beam protocol ("IR") (block 32). Such protocols for wireless communications typically require generally accurate direction of beams of light over relatively clear sight lines. When used with handheld devices, operational range is limited due to the need to accurately "aim" the IR beam. A preferred IR communications protocols is the Infrared Data Association's ("IRDA") protocol, which is specified to support wireless communication over an operable distance of up to about 3 meters.

A step of performing a medium range protocol search preferably comprises a search using a relatively low power radio frequency ("RF") protocol, with a preferred example comprising the Bluetooth protocol (block 32). The current Bluetooth version 1.0 protocol supports communication over distances of up to about 10 meters. A longer-range protocol search may be conducted using a longer range RF protocol such as the IEEE 802.11 standard commonly used for wireless local area networks ("WLAN") (block 36). This WLAN protocol is specified to support wireless communications over distances of from 50–100 meters, depending on environment.

Regardless of the protocol search used to locate or communicate with the second device, the second device once communicated with will be queried to determine whether it is capable of reporting location data (block 38). If the second device does not have location data capabilities, the present embodiment of the method of the invention will continue searching for additional second devices (block 40). If the second device has such capabilities, the location data is obtained (block 42).

It is noted that the term "location data capabilities" as used herein is intended to broadly refer to the ability to report current geographical location. Such capabilities preferably comprise RTLS systems. Other location data capabilities are of course possible within the practice of the invention, and may comprise by way of example manual location data input or triangulation from sources other than satellites such as RF or IR beacons or transmitters.

In order for a second device to operatively communicate with the peripheral device when the peripheral initiates contact with the second device, the second device must of course be able to recognize the query and be able to respond. This condition may exist within the practice of the invention under a number of different circumstances. Preferably, the second device is operating under a standard that provides for such functionality. Such interoperability standards are currently available, with more the subject of widespread development activities. Also, an embodiment of the invention may utilize a standard location data interrupt protocol for querying the second device operating system for reporting its location data.

Figure 4:
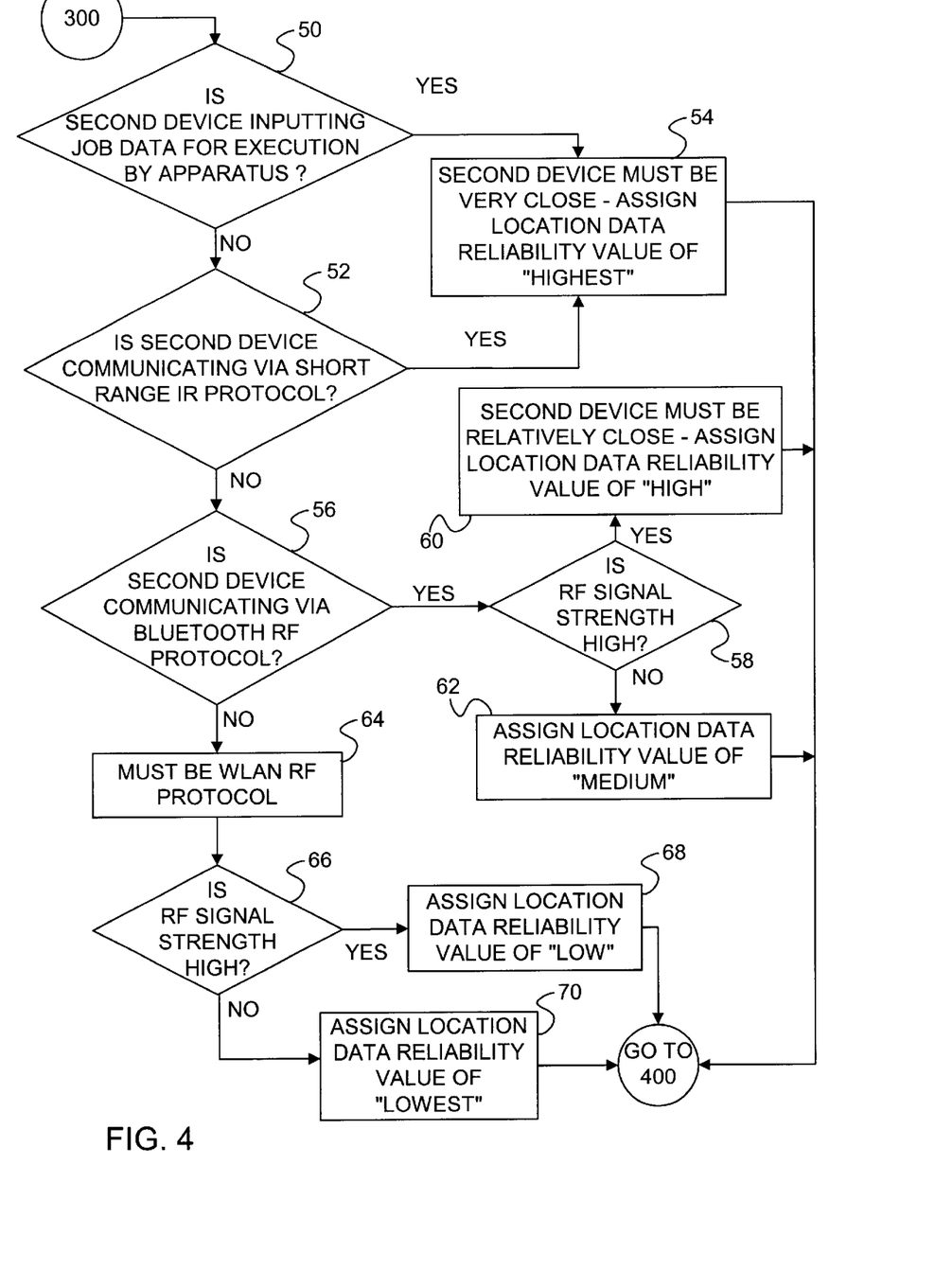
FIG. 4 is a flow chart illustrating a portion of an embodiment of the method and computer program of the invention comprising steps for assigning a distance factor value to second device location data.

Once obtained, the invention embodiment comprises steps of evaluating the second device location data to determine its relative reliability. Preferred methods for estimating data reliability are based on the premise that the closer the second device is to the peripheral, the more likely its location data is accurate for the peripheral. That is, the location data is evaluated to determine, or to at least estimate, the distance between the second device and the peripheral device. FIG. 4 illustrates a preferred subset of steps to perform such an evaluation.

With reference now made to the flow chart of FIG. 4, if it is determined that the second device was communicating with the peripheral device via a preferred short-range protocol, for instance, the likelihood is very high that the location data is accurate to a range of no more than 3 meters. In addition, if the second device is inputting job data for execution by the peripheral device, such as is the case when a print job is transmitted to a printer, it is likely that a mobile user is standing very near to the printer so as to retrieve his output regardless of the wireless communication protocol being used. Accordingly, steps of this invention embodiment comprise assigning a distance factor value of "highest" to the second device location data (block 54) upon the determination that job data is being input (block 50) or that a short range IR protocol is being used for communication (block 52).

The location data is limited to an accuracy of not less than 10 meters if it is being obtained via a preferred medium range wireless protocol such as the preferred Bluetooth protocol (block 56). The accuracy can be further refined upon a determination of the RF signal strength: a strong RF signal indicates the second device is towards the closer side of the 10 meter range, while a weak RF signal indicates that the second device is towards the farther side of the 10 meter range. Accordingly, this invention embodiment comprises preferred steps of determining a signal strength (block 58), and of further assigning a distance factor value of either "high" for a strong signal (block 60), or "medium" for a weak signal (block 62).

If the second device is communicating with the peripheral device via a medium range wireless protocol such as the preferred WLAN protocol (block 64), the location data is limited to an accuracy of not less than about 100 meters. Upon such a determination, the method of the invention comprises a preferred step of performing a signal strength determination (block 66) to further evaluate the location data. In particular, preferred steps of assigning a distance factor value of "low" for a relatively strong RF signal (block 68) and "lowest" for a relatively weak RF signal (block 70) are comprised.

Those knowledgeable in the art will appreciate that a number of additional signal strength determinations may be made within the practice of the method of the invention as claimed. Classification of signal strength of "highest", "high", "medium", "low", and "lowest" is made herein as a preferred and convenient example only. Other strength determinations may comprise, by way of example and not limitation, a numerical value quantifying signal strength with units of electrical power or the like. Further, a method embodiment could comprise a further step of referring to a correlation such as a calibration table that correlated signal strength to a fairly exact distance from the peripheral device. Considerations related to signal frequency, type of signal, and the like could of course likewise be made to gage data reliability.

Figure 5:
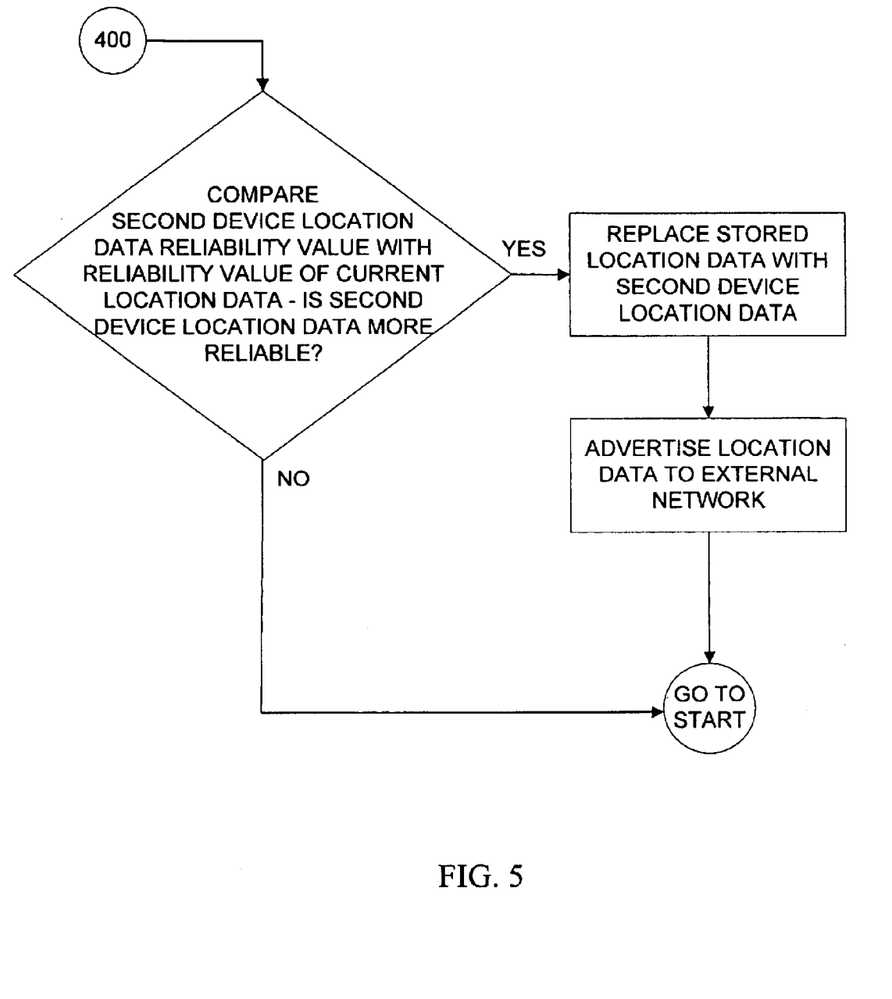
FIG. 5 is a flow chart illustrating a portion of an embodiment of the method and computer program of the invention comprising steps for comparing second device location data with current location data.

With reference to the flow chart of FIG. 5 now made, after the preferred subset of steps for assigning a distance factor value to the second device location data, this embodiment of the invention comprises comparing the second device location data to the current location data of the peripheral device (block 100). If the distance factor value of the second device location data is higher than the current peripheral device location data, the current data is replaced with the second location data (block 102). For example, if location data having a distance factor value of "highest" is obtained from a second device and the peripheral was operating using previously obtained location data that had a "medium" distance factor value, the medium data would be replaced with the highest data.

A subsequent preferred method step comprises advertising the newly obtained location data to an external network (block 104), such as an ISP service. This will allow, for example, for the ISP service to refer customers to the peripheral device. If the second device location data does not have a higher distance factor value, or if the second device location data has been saved, the method of the invention comprises a step of returning to the method steps that comprise detecting a trigger event (block 106). In this manner this embodiment of the invention will continually update the peripheral device location data as more accurate data becomes available.

Those knowledgeable in the art will appreciate that the present invention lends itself well to practice in the form of a computer program invention. Accordingly, an additional embodiment of the present invention comprises a computer program product for use by a peripheral device to determine a peripheral device location. The computer program product of the invention comprises a computer usable medium having computer readable program code embodied in the medium that when executed causes the peripheral device to perform the steps of the method of the invention as have been described herein. It will therefore be understood that reference to method steps made herein in regards to invention method embodiments are likewise intended to refer to peripheral device actions that occur as a result of the peripheral device executing computer readable instructions of a computer program embodiment of the invention.

The computer usable medium that the executable instructions of the program product of the invention are embedded within may comprise any of a number of means for storing computer executable instructions, with examples comprising memory mediums such as magnetic or optically readable disks, embedded circuitry such as chipsets and printed circuit cards, random access memory devices, and the like. The computer executable instructions may likewise comprise any of a number of instruction means as are generally known, including but not limited to common program language instructions such as C++, JAVA, portable device code such as a JAVA applet, or the like that have been converted by a compiler or the like into a machine readable format.

The term "computer" as used herein is intended to broadly refer to any processor-based machine capable of executing recorded instruction sets. Examples of computers as used herein thereby include not only personal computers, servers, PDA's and the like, but also processor based peripherals and tools. Indeed, a preferred example of a computer as used herein comprises a processor based document production peripheral device such as a copier, printer, facsimile machine, or combination printer/copier/facsimile.

The present invention thereby solves many of the heretofore-unresolved problems in the art in a novel and elegant manner. For example, peripherals such as printers that are relatively stationary but that may be moved from time to time are able to regularly update their location data without requiring the expense of having internal RTLS type components. Additionally, the various method and program product embodiments of the invention provide for obtaining location data without any action on the part of others; all that is required is that a second device with location data be accessible.

The advantages of the disclosed invention are thus attained in an economical, practical, and facile manner. While preferred embodiments and example configurations have been shown and described, it is to be understood that various further modifications and additional configurations will be apparent to those skilled in the art. For example, although various method and computer program steps have been illustrated and discussed in a particular sequence herein, it will be appreciated that the invention is not limited to any particular sequence of steps as claimed. Additionally, although reference to practice of the invention with peripheral devices such as printers, scanners, fax machines, and copiers has been made herein, it will be appreciated that many additional peripheral devices will benefit from the advantages practice of the invention. By way of example, it is anticipated that the invention may have utility for practice within the transportation arts. It is intended that the specific embodiments and configurations herein disclosed are illustrative of the preferred and best modes for practicing the invention, and should not be interpreted as limitations on the scope of the invention as defined by the appended claims.

Various features of the invention are set forth in the claims appended hereto.

What is claimed is:

1. A method for determining a location for a peripheral device comprising the steps of:

communicating via a wireless protocol with a second device;

querying said second device via said wireless protocol for location data;

obtaining said location data via said wireless protocol from said second device;

comparing said second device location data to peripheral device current location data;

replacing said peripheral device current location data with said second device location data if said second device location data is more reliable than said peripheral device current location data.

2. A method for determining a location for a peripheral device as defined by claim 1 wherein said step of communicating with a second device comprises searching for a second device with said wireless protocol.

3. A method for determining a location for a peripheral device as defined by claim 2 wherein said step of searching for a second device with said wireless protocol comprises the sequential steps of:

searching for a second device using a short-range wireless protocol;

searching for a second device using a medium range wireless protocol; and, searching for a second device using a long-range wireless protocol.

4. A method for determining a location for a peripheral device as defined by claim 1 wherein said wireless protocol has an operable range of less than about 10 meters.

5. A method for determining a location for a peripheral device as defined by claim 1 wherein said wireless protocol has an operable range of less than about 5 meters.

6. A method for determining a location for a peripheral device as defined by claim 1 wherein said wireless protocol is chosen from the group consisting of an infrared light beam wireless protocol and a radio frequency protocol.

7. A method for determining a location for a peripheral device as defined by claim 1 wherein the method further comprises the preliminary step of detecting a trigger to prompt said step of communicating by a wireless protocol with said second device.

8. A method for determining a location for a peripheral device as defined by claim 7 wherein said trigger is chosen from the group of events consisting of peripheral power-up, passage of a specified amount of time, detection of changed network connectivity settings, or reception of an interrupt signal.

9. A method for determining a location for a peripheral device as defined by claim 7 wherein said trigger having a first and a second stage, said first stage comprising receipt of an interrupt signal, and said second stage trigger comprising physical contact with the peripheral device.

10. A method for determining a location for a peripheral device as defined by claim 1 wherein said step of obtaining said second device location data via said wireless protocol comprises querying said second device for said location data after said second device has initiated communications via a wireless protocol with the peripheral to send job data to the peripheral for execution.

11. A method for determining a location for a peripheral device as defined by claim 1 wherein the method further comprises a step of transmitting said peripheral device current location data to an external network.

12. A method for determining a location for a peripheral device as defined by claim 1 wherein said step of querying said second device for location data further comprises first querying said second device to determine if said device has real time location system capabilities, and subsequently querying said device for location data if said device has real time location system capabilities.

13. A method for determining a location for a peripheral device as defined by claim 1 wherein said method further comprises the step of assigning a distance factor value to said second device location data, said distance factor value corresponding to the distance between said second device and the peripheral device, and wherein said step of comparing said second device location data to said peripheral device current location data comprises comparing said second device location data distance factor value to a distance factor value corresponding to said peripheral device current location data.

14. A method for determining a location for a peripheral device as defined by claim 13 wherein said step of assigning a distance factor value to said second device location data comprises:
   assigning a first distance factor value if said wireless protocol comprises a first wireless protocol having a first operable range;
   assigning a second distance factor value lower than said first distance factor value if said wireless protocol comprises a second wireless protocol having a second operable range greater than said first operable range; and,
   assigning a third distance factor value lower than said second distance factor value if said wireless protocol comprises a third wireless protocol having an operable range greater than said second operable range.

15. A method as defined by claim 14 wherein said first operable range comprises about 3 meters, said second operable range comprises about 10 meters, and said third operable range comprises about 100 meters.

16. A method for determining a location for a peripheral device as defined by claim 13 wherein the method further comprises the step of determining a signal strength for said wireless protocol, and wherein said distance factor value corresponds to said signal strength.

17. A method for determining a location for a peripheral device comprising the steps of:
   detecting a trigger event of either an internal or an external type, communicating with a second device via a wireless protocol after detection of said external type trigger event, searching for said second device via at least one wireless protocol after detection of said internal type trigger event;
   querying said second device via said wireless protocol for said second device location data;
   obtaining said second device location data via said wireless protocol from said second device;
   assigning a distance factor value to said second device location data, said distance factor value corresponding to the distance between said second device and the peripheral, said distance factor value trending higher as said distance trends smaller; and,
   comparing said second device location data distance factor value to a distance factor value corresponding to peripheral device current location data and replacing said current location data with said new location data if said second device location data has a higher distance factor value than said current location data.

18. A method for determining a location for a document production. apparatus connected to a communications network, the method comprising the steps of:
   detecting the occurrence of either an external trigger event or an internal trigger event;
   communicating with a second device after detection of said external trigger event;
   initiating a search for said second device after the detection of said internal trigger event, said search comprising a sequence of first searching for said second device with a first wireless protocol having a first operable range and subsequently searching for said a second device with a second wireless protocol having an operable range greater than said first operable range;
   querying said second device via a wireless protocol to determine if said second device has reportable location data, obtaining said second device location data if said second device has reportable location data;
   determining a distance factor value for said second device location data by:
   assigning a relatively high distance factor value if said second device is transmitting data comprising a job for execution to the document production apparatus;
   assigning a relatively high distance factor value if said second device is communicating with the document production apparatus via wireless protocol having an operable range of not more than about 3 meters;
   assigning a relatively medium distance factor value if said second device is communicating with the document production apparatus via a wireless protocol having an operable range of not more than about 10 meters;
   comparing said second device location data distance factor value to a distance factor value corresponding to peripheral device current location data;
   replacing said current location data with said second device location data if said second device location data has a higher distance factor value than said peripheral device current location data; and,
   transmitting said peripheral device current location data over the communications network.

19. A computer program product for use by a peripheral device to obtain location data for the peripheral device, the computer program product comprising computer executable instructions recorded in a computer readable medium, the instructions when executed causing the peripheral to:
   communicate via a wireless protocol with a second device;
   query said second device via said wireless protocol for location data;
   obtain said location data via said wireless protocol from said second device;
   compare said second device location data to peripheral device current location data; and,
   replace said peripheral device current location data with said second device location data if said second device location data is more reliable than said peripheral device current location data.

20. A computer program product as defined by claim 19 wherein causing the peripheral to search for a second device via a wireless protocol comprises searching for a second device through a sequence of searching for a second device within a first range, and searching for a second device within a second range that is greater than said first range.

21. A computer program product as defined by claim 19 wherein the computer program instructions when executed cause the peripheral to detect either an internal or external trigger event prior to causing the peripheral to communicate with said second device.

22. A computer program product as defined by claim 19 wherein the computer program instructions when executed further cause the peripheral to assign a distance factor value to said second device location data, said distance factor value corresponding to the distance between said second device and the peripheral, and wherein causing the peripheral to compare said second device location data said peripheral device to current location data comprises causing the peripheral to compare said second device location data distance factor value to a distance factor value corresponding to said peripheral device current location data.

23. A computer program product as defined by claim 22 wherein causing the peripheral to assign a distance factor value to said second device location data comprises causing the peripheral to:

assign a first distance factor value if said wireless protocol comprises a first protocol having a first operable range;

assign a second distance factor value lower than said first distance factor value if said wireless protocol comprises a second protocol having an operable range greater than said first operable range; and, assign a third distance factor value lower than said second distance factor value if said wireless protocol comprises a third protocol having an operable range greater than said second operable range.

24. A computer program product for use with a document production peripheral for obtaining location data for the document production peripheral, the computer program product comprising computer executable instructions embedded in a computer readable medium, the instructions when executed causing the document production peripheral to:

detect a trigger event of either an internal or an external type;

query a second device transmitting data to the document production peripheral via a wireless protocol for location data after detection of said external type trigger event;

search for a second device via at least one wireless protocol after detection of said internal type trigger event, and to query said second device via said at least one wireless protocol for second device location data;

obtain said second device location data via said wireless protocol from said second device;

assign a distance factor value to said second device location data, said distance factor value corresponding to the distance between said second device and the peripheral, with said distance factor value trending higher as said distance trends smaller; and, compare said second device location data distance factor value to a distance factor value corresponding to peripheral device current location data, and to replace said peripheral device current location data with said second device location data if device second device location data has a higher distance factor value than said peripheral device current location data.

25. A computer program product as defined by claim 24 wherein said external type trigger event comprises reception of an interrupt signal from an external source, and wherein said internal type trigger comprises passage of a predetermined time limit or document production peripheral power-up.

* * * * *